United States Patent Office 3,723,100
Patented Mar. 27, 1973

3,723,100
CORE WIRE MATERIAL FOR WELDING OF
SPHEROIDAL GRAPHITE CAST IRON
Hiroshi Matsumoto, Yono, Japan, assignor to Tokyo
Kakin Kogyo Co., Ltd., Tokyo, Japan
Filed Mar. 3, 1971, Ser. No. 120,420
Claims priority, application Japan, Mar. 11, 1970,
45/20,347
Int. Cl. C22c 37/04
U.S. Cl. 75—123 CB          1 Claim

ABSTRACT OF THE DISCLOSURE

A core wire material for welding spheroidal graphite cast iron having a spheroidized graphite structure consisting essentially of 2.5 to 4.5% by weight of C, 1 to 4.5% by weight of Si, 0.005 to 0.1% by weight of Mn, 0.003 to 0.08% by weight of P, 0.001 to 0.01% by weight of S, more than 0.006% by weight of Ca, more than 0.0002% by weight of Ba and the balance being essentially Fe.

---

Recently, spheroidal graphite cast iron has been produced extensively, and used broadly in the industrial field and consequently the welding has become more important.

The welding aims to enable to weld and assemble spheroidal graphite cast irons as a structural material as well as reparation of the product consisting of spheroidal graphite cast iron and is very important practically.

Of course, a deposited portion of weld zone must have the same spheroidal graphite structure as that of a base metal. oHwever, at present, this type of welding has been carried out by electric welding with an electrode consisting mainly of nickel and oxy-acetylene gas welding or electric welding with an electrode of magnesium spheroidal graphite cast iron, but these electrodes have the following defects:

The nickel electrode is expensive and even though carbides in the deposited portion are little, a hardened structure is formed in the heat-affected zone of the base metal near the deposited portion and the tensile strength lowers and the hardness increases and consequently the working is difficult. Furthermore, the weld zone is clearly distinguished from the base metal.

The electrode of magnesium spheroidal graphite cast iron is apt to precipitate a cementite even in the oxy-acetylated welding and the spheroidal graphite is liable to be disintegrated.

An object of the present invention is to solve the above-described defects.

As is well-known, when the spheroidal graphite cast iron is melted and then quenched on a cold metal, carbide is readily precipitated in the solidified graphite cast iron. It has been found that this precipitation of carbide is influenced by the contents of Mn, S, Mg and Ce among the chemical components contained in the spheroidal graphite cast iron except the contents of C and Si and therefore the precipitation of carbide lowers rapidly when said contents of Mn, S, Mg and Ce are reduced to given amounts. Moreover, it has been found that Ca, Ba and Zr are effective as the elements for preventing the precipitation of carbide in the spheroidal graphite cast iron.

It is assumed that the phenomenon caused in the deposited portion in the welding procedure shows substantially the same behavior as that in quenching of the melted spheroidal graphite cast iron on the cold metal as described above and consequently the inventor has considered that if the condition, under which carbide is hardly precipitated as described above, is applied to a core wire for welding rod, the object of the present invention will be attained.

Namely, the core wire of welding rod of the present invention has the composition of the following limited range in order to satisfy the above-described requirement, that is 2.5 to 4.5% by weight of C, 1 to 4.5% by weight of Si, 0.005 to 0.1% by weight of Mn, 0.003 to 0.08% by weight of P, 0.001 to 0.01% by weight of S, more than 0.006% by weight of Ca, more than 0.0002% by weight of Ba and the balance being essentially Fe.

In the production of said welding wire, a molten cast iron having the composition excluding Ca and Ba among the above-described components is firstly prepared and 1 to 5% by weight of Ba-containing calcium-silicon and 0.1 to 5% by weight of at least one of calcium chloride and calcium fluoride are added thereto as an additive to form a spheroidal graphite cast iron containing more than 0.0002% by weight of Ba and more than 0.006% by weight of Ca, which is inoculated with 0.5% by weight of Zr-containing ferrosilicon and casted in a casting mold, such as green sand mold, a $CO_2$ process mold, a shell mold, a metal mold and the like into a round rod having a diameter of 4 to 8 mm. After cooled, the rod is taken out from the casting mold and rolled and drawn by means of a cold roll, a hot roll or a swaging machine with or without annnealing into a wire material having a diameter of 2.5 mm., 3.2 mm. or 4 mm.

In the case of the daimeter of more than 4 mm., the rod may be used directly without rolling or after annealed as a core wire material. According to the present invention, the use of said shperoidal graphite cast iron as the core wire of welding rod is based on such a knowledge that the calcium spheroidal graphite cast iron containing barium has a characteristic that cementite is hardly formed and therefore no cementite is precipitated in the deposited portion and consequently the preheating and postheating steps can be omitted in welding procedure and a material having a large size or a large thickness or a processed product can be easily welded and the weld zone is not weak.

According to the present invention, the above-described limitation of the composition of the core wire of the welding rod is based on the following reasons.

C and Si have usual ranges for cast iron and most cast irons are within the above ranges.

When the contents of Mn and S exceed the upper limits of the above ranges, cementite is liable to be precipitated upon quenching, while the lower limits are based on the fact that it is very difficult industrially to decrease the amount to less than the lower limits.

When the content of P exceeds the upper limit of the above range, a brittle phosphorous eutectic appears in the structure of spheroidal graphite cast iron and mechanical properties of the deposited portion lower, while in the case of less than the lower limit the industrial operation is difficult.

Moreover, when the contents of Ca and Ba are more than 0.006% and more than 0.002% respectively, a characteristic effect as the calcium spheroidal graphite cast iron containing barium is developed, but when the contents do not reach the above values, a desired structure cannot be obtained.

The core wire material of welding rod of the present invention has the following advantages:

(1) The core wire of the present invention hardly forms cementite as the characteristic of calcium spheroidal graphite containing barium, so that when using said core wire, the cementite is not precipitated in the deposited portion and therefore the preheating and postheating steps may be omitted. Furthermore, mechanical properties do not lower, even if the weld zone is not heat-treated.

(2) The depositing to the base metal is very good. Accordingly, when the weld zone is finished after the welding, the weld zone cannot be distinguished.

(3) The core wire is calcium spheroidal graphite cast iron, so that there is no fear that the spheroidal graphite disintegrates at a high temperature in the welding, while magnesium spheroidal graphite has such a fear. This is due to the fact that the boiling point of calcium is higher than that of magnesium, so that the vapour pressure of calcium is lower than that of magnesium and there is no disadvantageous loss.

(4) Since the calcium spheroidal graphite cast iron containing barium is readily converted into ferrite, the hardness of weld zone is not high and, if necessary, the cutting may be easily effected.

(5) Since the weld zone has a completely spheroidal graphite structure, the strength of the deposited portion is equal to that of the base metal.

(6) The molten flow of the calcium spheroidal graphite cast iron containing barium is very smooth, so that a fine rod having a diameter of about 4 mm. can be easily manufactured.

For a better understanding of the invention, reference is made to the accompanying drawings, wherein.

Figure 1:
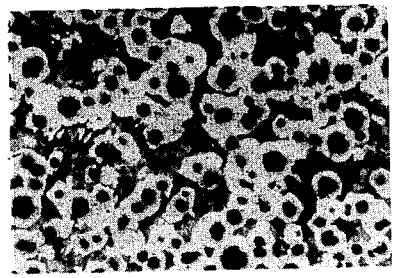
FIG. 1 is a microphotograph of 50 magnifications of a base metal consisting of spheroidal graphite cast iron.

The invention will be explained with reference to the following examples.

EXAMPLE 1

One hundred kg. of pig iron for ductile cast iron made by Kamaishi Iron Production Co. was melted in a basic Héroult electric furnace and a basic slag consisting of lime stone and powdery coke was added thereto to effect desulfurization thoroughly, whereafter the resulting molten cast iron was taken out from the furnace into a ladle of 150 kg. capacity.

A flux consisting of a mixture of powdery lime stone and powdery iron oxide of 1:1 was added to the molten cast iron and then oxygen was blown thereinto at about 1.5 atmospheric pressure from an oxygen bomb through a lance pipe, one end of which being covered with a refractory, for about 5 minutes, whereby excess amounts of C, Si, Mn and other impurities contained in the molten cast iron were oxidized and removed.

The pig iron for ductile cast iron used herein had the following composition:

|  | Percent |
|---|---|
| C | 4.12 |
| Si | 1.08 |
| Mn | 0.24 |
| P | 0.08 |
| S | 0.036 |

The molten cast iron obtained by the above-mentioned method had the following composition:

|  | Percent |
|---|---|
| C | 3.62 |
| Si | 0.02 |
| Mn | 0.05 |
| P | 0.031 |
| S | 0.024 |

The molten cast iron was again charged in a basic lining Héroult electric furnace and a slag forming agent was added thereto to form a carbide slag whereby the desulfurization was thoroughly effected and then a given amount of Si was added.

Thereafter, the the temperature of the molten cast iron was raised to 1,500° C. The molten cast iron was taken out from said furnace into a ladle and 3% by weight based on the molten cast iron of an adhesive of 85% of barium-containing calcium-silicon particles coated with 15% of calcium chloride was added thereto and then the resulting mixture was inoculated with 0.5% by weight of zirconium-containing ferrosilicon and casted in a green sand mold to form a rod having a diameter of 6 mm. and a length of 600 mm. The composition of the resulting rod was as follows:

|  | Percent |
|---|---|
| C | 3.58 |
| Si | 3.22 |
| Mn | 0.05 |
| P | 0.029 |
| S | 0.008 |
| Ca | 0.012 |
| Ba | 0.003 |

The rod had a completely spheroidal structure, a greater part of which was a ferrite structure and a part of which was a pearlite structure.

EXAMPLE 2

When scraps of punched pure iron and electrode dust were charged and melted in a magnesia-lining high frequency induction furnace and a given amount of carbon was added to the pure iron, a refined ferrosilicon containing a little impurities (content of Si, 80%) was added thereto to adjust the content of silicon in the molten iron. After raising the temperature to 1,500° C., the resulting molten iron was taken out from the furnace into a ladle.

The molten cast iron in the ladle was added with 3% by weight of the same additive of the barium-containing calcium silicon as in Example 1 and inoculated with 0.5% of zirconium-containing ferrosilicone and then casted in a green sand mold to form a rod having a diameter of 4 mm. and a length of 600 mm.

The composition of the punched pure iron scrap to be used was as follows:

|  | Percent |
|---|---|
| C | 0.02 |
| Si | 0.01 |
| Mn | 0.005 |
| P | 0.01 |
| S | 0.004 |

The thus obtained rod had a completely spheroidal graphite structure, which consisted mainly of ferrite and contained a small amount of pearlite. The composition of the rod was as follows:

|  | Percent |
|---|---|
| C | 3.73 |
| Si | 2.92 |
| Mn | 0.008 |
| P | 0.01 |
| S | 0.005 |
| Ca | 0.006 |
| Ba | 0.002 |

Moreover, a part of the rods produced in Examples 1 and 2 was rolled and drawn into wires having a diameter of 3.2 mm. or 2.5 mm. by means of a roll and swaging machine.

Each core wire produced by the above-mentioned method was directly applied to an oxy-acetylene welding or an inert-gas tungsten-arc welding, or to an arc welding as a coated electrode and the welding experiments were carried out. The obtained results are as follows.

WELDING EXPERIMENTS

(1) Production of base metal for welding

A pig iron for ductile cast iron produced by Kamaishi Iron Production Co. was melted in a high frequency induction furnace and the resulting molten cast iron was desulfurized and then added with 1.5% by weight of an additive consisting of 70% of Ca-Si, 20% of rare earth metal chloride and 10% of $CaCl_2$ and inoculated with 0.4% by weight of Fe-Si and the resulting mass was cast in twenty Y-block molds (JIS-A) made of sodium silicate and carbon dioxide gas. A test piece (JIS 4) was taken out from the cast bodies and the structure was measured and a mechanical test was made.

The elemental analysis and mechanical properties of the base metal are as follows:

Elemental analysis:

| | Percent |
|---|---|
| Total carbon | 3.72 |
| Si | 2.32 |
| Mn | 0.26 |
| P | 0.073 |
| S | 0.018 |

Mechanical properties:

| | |
|---|---|
| Tensile strength _____kg./mm.$^2$ | 52.4 |
| Elongation _____percent | 11.2 |

Furthermore, the structure of the base metal is shown in FIG. 1.

(2) Production of welded test piece

Figure 2:
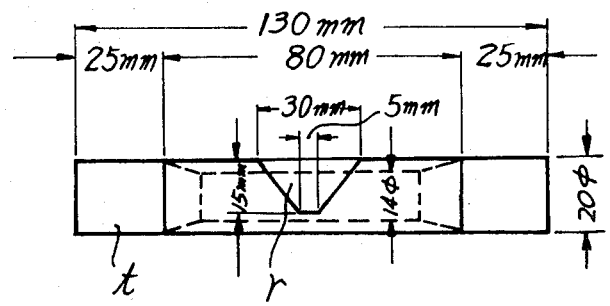
FIG. 2 is a cross-sectional view for illustrating the manner to make a test piece.

A sample $t$ as shown in a solid line of FIG. 2 was cut out from the Y-block as described above. Then, the recess $r$ of the sample $t$ was welded and reinforced with the bare wire for oxy-acetylene welding or inert-gas tungsten arc welding or the flux-coated electrode for arc welding according to the present invention and then the welded sample $t$ was worked into a test piece (JIS 4) as shown in a dotted line of FIG. 2. The tensile strength and the microscopic structure were determined with respect to the test piece.

(3) Results of welding tests

A. Oxy-acetylene welding test

| Experiment number | Cutting position of test piece | Tensile strength, kg./mm.$^2$ | Elongation, percent | Vickers hardness of weld zone |
|---|---|---|---|---|
| 1 | Weld zone | 51.2 | 3.6 | 236 |
| 2 | do | 53.4 | 2.8 | 232 |
| 3 | Boundary between base metal and weld zone | 51.6 | 2.8 | 242 |
| 4 | Base metal | 48.3 | 9.6 | 236 |

Figure 3:
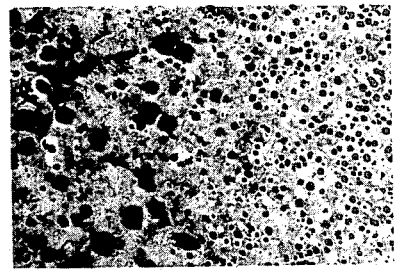
FIG. 3 is a microphotograph showing a deposit boundary structure between a base metal and a weld zone by an oxy-acetylene welding with the core wire of the present invention without using a flux.

The microscopic structure of the deposit boundary between the weld zone and the base metal is shown in FIG. 3, wherein the shape of graphite in the reinforced portion is small and uniform. Furthermore, the deposition is completely effected because the movement of ground structure in the weld zone is unclear. The oxy-acetylene flame to be used was a neutral flame.

B. Inert-gas tungsten arc welding test

| Experiment number | Cutting position of test piece | Tensile strength, kg./mm.$^2$ | Elongation, percent | Vickers hardness of weld zone |
|---|---|---|---|---|
| 5 | Base metal | 52.6 | 3.6 | 242 |
| 6 | Weld zone | 54.3 | 4.2 | 236 |
| 7 | do | 48.2 | 4.6 | 236 |

Figure 4:
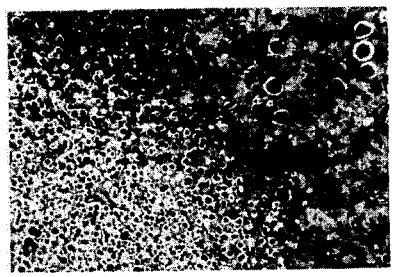
FIG. 4 is a microphotograph showing a deposit boundary structure between a base metal and a weld zone by a tungsten-arc welding in an inert gas atmosphere with the core wire of the present invention.

A tungsten arc welding machine was used in an argon gas atmosphere as a welding machine, in which a capacity was 300 A., a welding current was 80 A. and a diameter of an electrode was 3.2 mm. The microscopic structure of the deposit boundary between the weld zone and the base metal is shown in FIG. 4, wherein the shape of graphite in the reinforced portion is small and uniform. Furthermore, the ground structure is not clear in the weld zone, the deposition is complete and cementite is not precipitated.

C. Arc welding test with flux coated electrode

| Experiment number | Cutting position of test piece | Tensile strength, kg./mm.$^2$ | Elongation, percent | Vickers hardness of weld zone |
|---|---|---|---|---|
| 8 | Weld zone | 53.6 | 2.0 | 246 |
| 9 | do | 51.4 | 1.6 | 262 |
| 10 | do | 52.6 | 1.8 | 244 |

Figure 5:
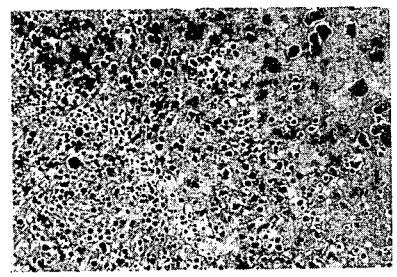
FIG. 5 is a microphotograph showing a deposit boundary structure between a base metal and a weld zone by an electric-arc welding with the flux-coated core wire of the present invention.

The core wire having a diameter of 4 mm. was coated with a flux obtained by thoroughly mixing 30% of Ca-Si of less than 50 mesh, 15% of rare earth metal carbonate, 10% of calcium fluoride of less than 50 mesh, 20% of borax of less than 50 mesh and 25% of anhydrous sodium carbonate and then foming the resulting mixture with a solution of 10% sodium silicate. A D.C. arc welding machine of 15 kw. was used as a welding machine, in which the current was 180 A. The microscopic structure of the deposit boundary between the base metal and the weld zone is shown in FIG. 5, wherein the shape of graphite in the reinforced portion is small and uniform.

In the oxy-acetylene welding and the tungsten arc welding, a considerable amount of ferrite structure appeared in the reinforced portion, while in the arc welding using the flux coated electrode, pearlite is somewhat larger, but cementite is not precipitated and the deposition is complete.

In any case, the cutting ability in working of the test piece was excellent, and the chip of the test piece was the same to that of the base metal. Furthermore, there was no formation of pinhole and blowhole. From the above-described results, it can be seen that the core wire having the composition according to the present invention has remarkably excellent properties.

Moreover, it has been proved from the experimental results that the core wire of the present invention is effectively applied for welding a common cast iron.

What is claimed is:

1. A core wire material for welding spheroidal graphite cast iron having a spheroidized graphite structure which consists essentially of 2.5 to 4.5% by weight of C, 1 to 4.5% by weight of Si, 0.005 to 0.1% by weight of Mn, 0.003 to 0.08% by weight of P, 0.001 to 0.01% by weight of S, more than 0.006% by weight of Ca, more than 0.0002% by weight of Ba and the balance being essentially Fe.

References Cited

UNITED STATES PATENTS 2,948,605  8/1960  Ihrig _____ 75—123 CB X

FOREIGN PATENTS 1,292,998  7/1969  Germany _____ 75—123 CB
980,614  1/1965  Great Britain _____ 75—123 CB HYLAND BIZOT, Primary Examiner J. E. LEGRU, Assistant Examiner